United States Patent [19]
Azuma

[11] Patent Number: 5,387,303
[45] Date of Patent: Feb. 7, 1995

[54] METHOD AND APPARATUS FOR FORMING RUBBER SHEET HAVING CORDS THEREIN

[75] Inventor: Toshio Azuma, Higashiyamato, Japan

[73] Assignee: Bridgestone Corporation, Tokyo, Japan

[21] Appl. No.: 83,321

[22] Filed: Jun. 29, 1993

Related U.S. Application Data

[63] Continuation of Ser. No. 725,858, Jul. 2, 1991, abandoned.

[30] Foreign Application Priority Data

Jul. 18, 1990 [JP] Japan .................. 2-189713

[51] Int. Cl.$^6$ ............... B32B 31/08; B32B 31/10; B32B 31/20; B32B 31/30
[52] U.S. Cl. ..................... 156/179; 156/209; 156/243; 156/244.12; 156/437; 156/501; 156/553; 156/555
[58] Field of Search ............ 156/140, 178, 179, 209, 156/210, 213, 243, 244.12, 244.15, 244.25, 437, 500, 553, 501, 244.23, 244.27, 555; 264/174, 175; 425/114; 198/847; 427/211; 118/249

[56] References Cited

U.S. PATENT DOCUMENTS

| | | | |
|---|---|---|---|
| 1,321,223 | 11/1919 | Marquette | 156/179 |
| 1,509,365 | 9/1924 | Midgley | 156/437 |
| 1,600,119 | 9/1926 | Macklin | 118/249 |
| 1,608,102 | 11/1926 | Jury | 156/178 |
| 1,651,806 | 12/1927 | Castricum et al. | 156/437 |
| 1,742,777 | 1/1930 | Midgley | 156/437 |
| 2,260,453 | 10/1941 | Hartman | 264/175 |
| 2,439,043 | 4/1948 | Evans | 156/140 |
| 2,512,762 | 6/1950 | Benson et al. | 156/437 |
| 3,049,460 | 8/1962 | Garbin et al. | 156/141 |
| 3,478,138 | 11/1969 | Friesner | 264/175 |
| 3,540,956 | 11/1970 | Arnold et al. | 156/54 |
| 4,019,941 | 4/1977 | Prince et al. | 156/179 |
| 4,240,857 | 12/1980 | DellaVecchia et al. | 156/244.25 |

FOREIGN PATENT DOCUMENTS

| | | | |
|---|---|---|---|
| 220509 | 10/1957 | Australia | 156/244.25 |
| 0109222 | 5/1984 | European Pat. Off. | |
| 0281882 | 9/1988 | European Pat. Off. | |
| 1491661 | 8/1967 | France | 264/175 |
| 1144863 | 3/1969 | United Kingdom | |

OTHER PUBLICATIONS

European Search Report.

Primary Examiner—Michael W. Ball
Assistant Examiner—Steven D. Maki
Attorney, Agent, or Firm—Sughrue, Mion, Zinn, Macpeak & Seas

[57] ABSTRACT

An apparatus for forming a rubber sheet having cords embedded therein includes a grooved roll formed in its circumference with a plurality of circumferential grooves for arranging cords with equal pitches, and a pressure-joining roll arranged spaced from the grooved roll for pressure-joining a first rubber sheet with the cords arranged with the equal pitches in a first pressure-joining position between the grooved roll and the pressure-joining roll. The apparatus further includes a groove forming roll for forming a plurality of longitudinal grooves in one surface of a second rubber sheet, and a forming roll arranged spaced from the pressure-joining roll to form a second pressure-joining position between the forming roll and the pressure-joining roll. When the first and second rubber sheet are supplied into the second pressure-joining position, they are pressure-joined with each other, while at the same time halves of the cords projecting from the first rubber sheet into the longitudinal grooves of the second rubber sheet to form a rubber sheet having the cords therein.

10 Claims, 4 Drawing Sheets

FIG_1

FIG_2

FIG_3

FIG_4

FIG_5

FIG_6

FIG_7

FIG_8

FIG_9

METHOD AND APPARATUS FOR FORMING RUBBER SHEET HAVING CORDS THEREIN

This is a continuation of application Ser. No. 07/725,858 filed Jul. 2, 1991.

BACKGROUND OF THE INVENTION

This invention relates to a method and an apparatus for forming a rubber sheet having cords therein by coating a rubber material on both sides of a plurality of parallel cords.

Methods and apparatuses for forming rubber sheets having cords therein have been known as disclosed, for example, in PCT Publication No. WO 89/10,834. In the method disclosed in the Publication, a plurality of cords are supplied into circumferential grooves formed in the outer circumference of a forming roll on one side of its axial direction to arrange the cords with equal pitches. Thereafter, a first rubber sheet is pressure-joined with one side of the cords arranged with equal pitches in a first pressure-joining position between the forming roll and a pressure-joining roll. The cords joined on their one side with the first rubber sheet are then fed to a second pressure-joining position spaced a predetermined distance in the axial direction of the forming roll from the first pressure-joining position, during which the cords are twisted and turned through 180°. Thereafter, a second rubber sheet having a rectangular cross-section is supplied into a second pressure-joining position between the forming roll and the pressure-joining roll so that first and second rubber sheets are pressure-joined with each other to form a rubber sheet having cords therein.

In the method of forming the rubber sheet having cords as above described, after the cords joined with the first rubber sheet have been moved away from the first pressure-joining position, the cords are fed to the second pressure-joining position spaced in the axial direction from the first pressure-joining position, while the cords are twisted and turned through 180° by a plurality of guide rollers. Consequently, the cords joined with the first rubber sheet are considerably deformed during their movement from the first pressure-joining position to the second pressure-joining position. As a result, the pitches of the cords previously regulated in order by the circumferential grooves of the forming roll are unavoidably disturbed during the movement to the second pressure-joining position. Moreover, the cords in the second pressure-joining position are free from the restraint by the grooves of the roll, and rubber material of the second rubber sheet tends to flow in the axial directions of the forming roll when the first and second rubber sheets are being pressure-joined with each other. Therefore, cords are pulled by the flow of the rubber material so as to cause the pitches of the cords to be further disturbed.

SUMMARY OF THE INVENTION

It is an object of the invention to provide a method and an apparatus for forming a rubber sheet having cords therein, which eliminate all the disadvantages of the prior art and are able to remarkably improve the accuracy of pitches of cords embedded in the rubber sheet.

In order to achieve this object, the method of forming a rubber sheet having cords therein according to the invention comprises steps of supplying a plurality of cords into circumferential grooves formed in the outer circumference of a grooved roll and spaced from one another with equal pitches in the axial direction of the grooved roll to arrange the cords with equal pitches, pressure-joining a first rubber sheet with halves of the cords of the equal pitches on their one side in a first pressure-joining position between the grooved roll and a pressure-joining roll, guiding each cord joined on its one side with the first rubber sheet to move the cord in a respective plane including the first pressure-joining position and perpendicular to the rotating axis of the pressure-joining roll from the first pressure-joining position to a second pressure-joining position angularly spaced a predetermined angle in a circumferential direction from the first pressure-joining position, supplying a second rubber sheet formed in at least one surface with a plurality of longitudinal grooves spaced with pitches equal to the pitches of the cords into the second pressure-joining position between a forming roll and the pressure-joining roll, and pressure-joining the first and second rubber sheets with each other, while at the same time burying halves of the cords projecting from the first rubber sheet into the longitudinal grooves of the second rubber sheet to form a rubber sheet having the cords therein.

Moreover, the apparatus for forming a rubber sheet having cords therein according to the invention comprises a grooved roll formed in its circumference with a plurality of circumferential grooves spaced with equal pitches in the axial direction of the grooved roll for arranging cords with equal pitches upon supplying the cords into the circumferential grooves, a pressure-joining roll arranged to cooperate with the grooved roll at a first pressure-joining position for pressure-joining a first rubber sheet with the cords arranged with the equal pitches on their one side, a groove forming roll for forming in at least one surface of a second rubber sheet a plurality of longitudinal grooves spaced with pitches equal to the pitches of the cords, and a forming roll arranged to cooperate with the pressure-joining roll for pressure-joining the first and second rubber sheets with each other, such as to fit halves of the cords projecting from the first rubber sheet into the longitudinal grooves of the second rubber sheet at a second pressure-joining position angularly spaced a predetermined angle in its circumferential direction from the first pressure-joining position, axes of the grooved roll, the pressure-joining roll, the groove forming roll and the forming roll being parallel to each other.

In order to form a rubber sheet having cords therein according to the present invention, cords are first supplied into the circumferential grooves of the grooved roll to arrange the cords with equal pitches. Thereafter, the first rubber sheet is pressure-joined with one side of the cords in the first pressure-joining position between the grooved roll and the pressure-joining roll. In pressure-joining, as the cords are restrained by the circumferential grooves of the grooved roll, they are maintained with the pitches with high accuracy over the entire width of the first rubber sheet.

The cords joined on their one side with the first rubber sheet are then fed to the second pressure-joining position angularly spaced the predetermined angle in the circumferential direction from the first pressure-joining position. In this case, each of the cords joined with the first rubber sheet is respectively moved in the vertical plane including the first pressure-joining position and perpendicular to the rotating axis of the pressure-joining roll. During such a movement, the cords joined with the first rubber sheet are steadily fed from the first pressure-joining position to the second pressure-joining position in this manner without being twisted and turned. Accordingly, the pitches of the cords are not disturbed.

At this time, the second rubber sheet is formed in at least one surface with a plurality of longitudinal grooves by the groove forming roll and is then supplied into the second pressure-joining position between the forming roll and the pressure joining roll. The cords joined with the first rubber sheet are also supplied into the second pressure-joining position. Then, halves of the cords projecting from the first rubber sheet are buried into the longitudinal grooves of the second rubber sheet in the second pressure-joining position, respectively, while the first and second rubber sheets are pressure-joined with each other by means of the forming roll and the pressure-joining roll to form a rubber sheet having cords therein.

In pressure-joining the first and second rubber sheets in this case, the respective cords are buried into the longitudinal grooves of the second rubber sheet spaced with each other with pitches equal to the pitches of the cords. Therefore, the cords are restrained by the longitudinal grooves, and the rubber material of the second rubber sheet does not flow in the axial direction of the pressure-joining roll. As a result, the pitches of the cords are maintained with high accuracy.

The invention will be more fully understood by referring to the following detailed specification and claims taken in connection with the appended drawings.

DESCRIPTION OF THE PREFERRED EMBODIMENTS

Figure 1:
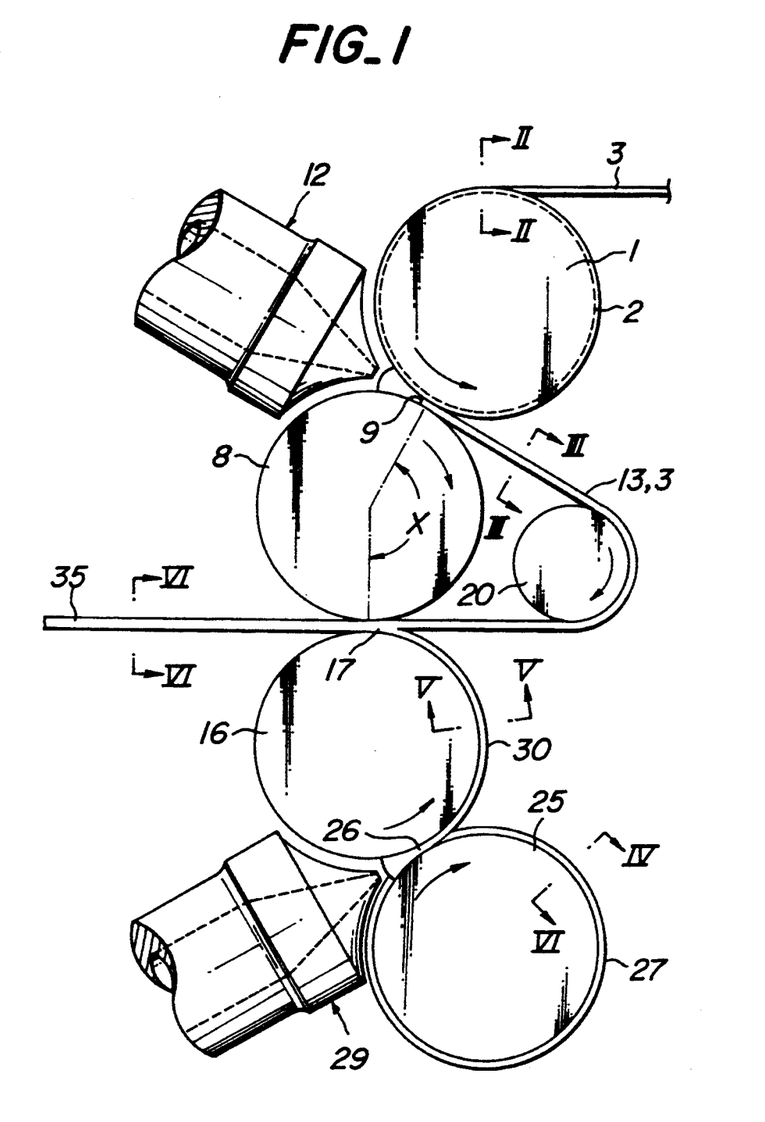
FIG. 1 is a schematic front elevation of the first embodiment of the invention.
Figure 2:
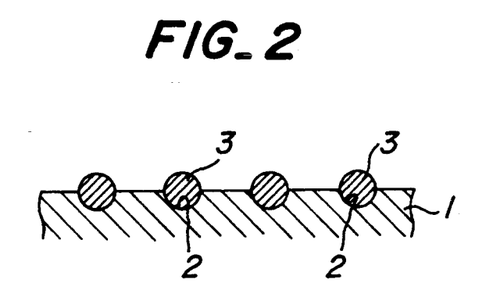
FIG. 2 is a partial sectional view taken along the line II—II in FIG. 1 and illustrating the cords and the circumferential grooves of the grooved roll.

Referring to FIGS. 1 and 2, a horizontal grooved roll 1 is formed in its outer circumference with a plurality (equal to the number of cords 3) of circumferential grooves 2 continuously extending in the circumferential direction and having a semicircular cross-section. These circumferential grooves 2 are spaced in the axial directions of the roll 1 from one another with equal intervals or pitches which are also equal to a pitch P of the cords 3.

Each of the cords 3 consists of a monocord (single filament) or twisted cords and is made of textile, steel or aramid fiber. After the cords 3 have been subjected to dipping treatment, they are supplied from the forward position of the grooved roll 1 toward it and fed into the circumferential grooves 2 of the roll 1, respectively. As the circumferential grooves 2 have the semicircular cross-section, substantial halves of the cords 3 are buried in the circumferential grooves 2, while the remaining halves project beyond the outer circumference of the grooved roll 1. Therefore, these cords 3 are snugly arranged in order with equal pitches equal to the set pitch P.

A pressure-joining roll 8 is arranged below and parallel to the grooved roll 1 to form a first pressure-joining position 9 between the pressure-joining roll 8 and the grooved roll 1. The clearance between the rolls 1 and 8 at the first pressure-joining position 9 is substantially equal to the thickness of a first rubber sheet later described.

Figure 3:
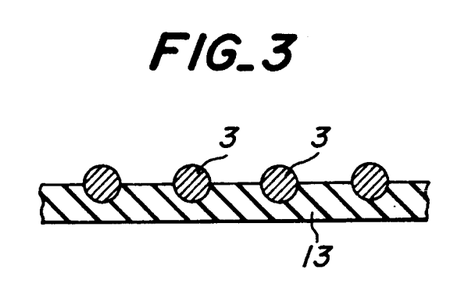
FIG. 3 is a sectional view taken along the line III—III in FIG. 1 and illustrating the cords buried in the first rubber sheet.

A head 12 of an extruder is provided rearward of the grooved roll 1 and the pressure-joining roll 8. An unvulcanized rubber is supplied from the head 2 into the first pressure-joining position 9. As a result, the unvulcanized rubber is formed into a first rubber sheet 13 in the form of a sheet by the action of the grooved roll 1 and the pressure-joining roll 8, and at the same time the first rubber sheet 13 is urged against or pressure-joined with the halves of the cords 3 arranged with the equal pitches P to form a rubber cord sheet as shown in FIG. 3. In this case, the amount of the rubber supplied from the head 12 into the first pressure-joining position 9 is substantially equal to the amount of the rubber of the first rubber sheet 13 delivered from the first pressure-joining position 9. As a result, no bank of the rubber is formed at the first pressure-joining position 9 or at the most a bank is formed by a very small amount of the rubber.

A forming roll 16 is arranged below and parallel to the pressure-joining roll 8. Formed between the pressure-joining roll 8 and the forming roll 16 is a second pressure-joining position 17 of a clearance substantially equal to the sum of the thicknesses of the first rubber sheet 13 and a second rubber sheet later described. Moreover, the second pressure-joining position 17 is angularly spaced by a predetermined angle (X degree in FIG. 1) from the first pressure-joining position 9 in the circumferential direction of the pressure-joining roll 8. Further, the second pressure-joining position 17 is positioned in a vertical plane including the first pressure-joining position 9 and perpendicular to the rotating axis of the pressure-joining roll 8. The first and second pressure-joining positions 9 and 17 overlap each other in the axial direction of the pressure-joining roll 8.

A guide roll 20 is arranged forward of and spaced from the pressure-joining roll 8. The cords 3 with their one side joined to the first rubber sheet 13 at the first pressure-joining position 9 are fed from the position 9 to the guide roll 20. The guide roll 20 guides the cords 3 so as to turn its feeding direction thereabout to feed the cords 3 toward the second pressure-joining position 17. During this movement, each of the cords 3 with the first rubber sheet 13 is moved in the respective vertical plane perpendicular to the rotating axis of the pressure-joining roll 8 without being shifted in the axial direction of the roll 8 and without being subjected to any torsional force. Moreover, when the first rubber sheet 13 is being fed on the guide roll 20, useless projections extending from side edges of the first rubber sheet 13 may be cut off by means of a cutter (not shown).

Figure 4:
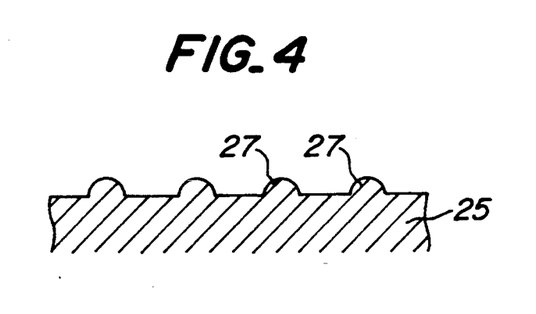
FIG. 4 is a sectional view taken along the line IV—IV in FIG. 1 and illustrating a section of the groove forming roll.

A groove forming roll 25 is arranged below and parallel to the forming roll 16. Formed between the groove forming roll 25 and the forming roll 16 is a forming position 26 whose clearance is substantially equal to the thickness of the second rubber sheet later described. As shown in FIG. 4, the groove forming roll 25 is formed on its outer circumference with a plurality (equal to the number of the cords 3) of ridges 27 continuously extending in the circumferential direction and having a semicircular cross-section. These ridges 27 are spaced from one another in the axial direction of the groove forming roll 25 with a pitch equal to the pitch P of the cords 3.

Figure 5:
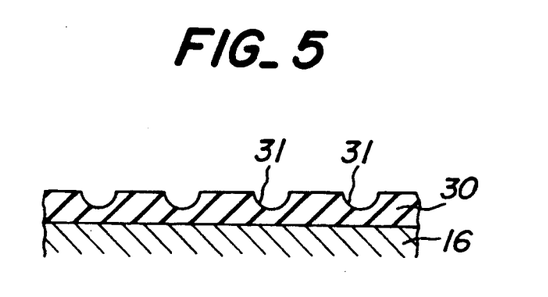
FIG. 5 is a sectional view taken along the line V—V in FIG. 1 and illustrating the forming roll and the second rubber sheet formed with the longitudinal grooves.

A head 29 of an extruder is arranged rearward of the forming roll 16 and the groove forming roll 25. An unvulcanized rubber is supplied from the head 29 into the forming position 26. As a result, the unvulcanized rubber is formed into a second rubber sheet 30 in the form of a sheet in the forming position 26 by means of the forming roll 16 and the groove forming roll 25. At this time, the second rubber sheet 30 has formed in its one surface with a plurality (equal to the number of the cords) of longitudinal grooves 31 having a semicircular cross-section, extending in longitudinal directions and spaced from one another with a pitch equal to the pitch P of the cords 3 as shown in FIG. 5.

In this case, the amount of the rubber supplied from the head 29 into the forming position 26 is substantially equal to the amount of the rubber of the second rubber sheet 30 delivered from the forming position 26. As a result, no build-up of the rubber is formed at the forming position 26 or at the most a built-up is formed by a very small amount of the rubber. The second rubber sheet 30 is guided along the outer circumference of the forming roll 16 by its rotation toward the second pressure-joining position 17 to which the first rubber sheet 13 and the cords 3 are also fed as above described. At the second pressure-joining position 17, the first and second rubber sheets 13 and 30 and the cords 3 are united.

Figure 6:
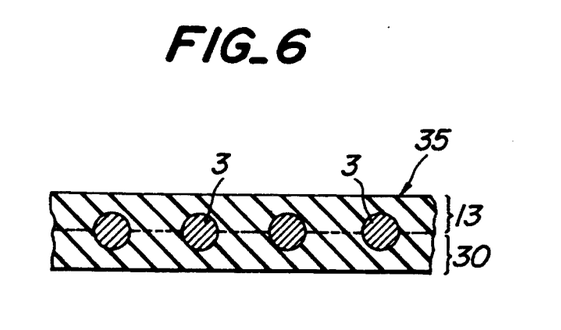
FIG. 6 is a sectional view taken along the line VI—VI in FIG. 1 and illustrating a rubber sheet having cords embedded therein formed by the first embodiment of the invention.

Consequently, the portions of the cords 3 projecting beyond the first rubber sheet 13 are buried into the longitudinal grooves 31 of the second rubber sheet 30, while the first and second rubber sheets 13 and 30 are pressure-joined with each other by means of the pressure-joining roll 8 and the forming roll 16 to form a rubber sheet 35 having cords embedded therein as shown in FIG. 6. The rubber sheet 35 having cords thus formed is used as a ply for constituting, for example, carcass, belt or the like of a pneumatic tire.

Each of the grooved roll 1, the pressure-joining roll 8, the forming roll 16, the guide roll 20 and the groove forming roll 25 have rotating axes in parallel with one another and rotatably supported on a frame (not shown). Moreover, in order to suitably adjust the thickness of the first rubber sheet 13, the grooved roll 1 is movable toward and away from the pressure-joining roll 8, while in order to suitably adjust the thickness of the second rubber sheet 30, the groove forming roll 25 is movable toward and away from the forming roll 16. Further, the forming roll 16 is movable toward and away from the pressure-joining roll 8 correspondingly to the change of the thicknesses of the first and second rubber sheets 13 and 30.

In order to avoid detrimental influence resulting from deformation and difference in thermal expansion of the rolls 1, 8, 16 and 25 and temperature distribution on these rolls and to improve roundness and parallelism of these rolls, these rolls are manufactured with the following particular caution. That is, axial lengths of these rolls are made short relatively to their diameters and their cylindrical shapes are formed as precisely as possible (equal diameters at centers and both ends or free from so-called "crown").

The operation of the apparatus according to the first embodiment of the invention will be explained hereinafter.

It is assumed that substantial halves of cords 3 supplied to the grooved roll 1 have been buried in the circumferential grooves 2 of the grooved roll 1. At this time, as the circumferential grooves 2 are spaced from one another by the pitch P in the axial direction of the grooved roll 1, the plurality of the cords 3 are arranged with the set pitch with high accuracy.

By rotation of the grooved roll 1, the cords 3 are moved to arrive at the first pressure-joining position 9. An unvulcanized rubber is supplied from the head 12 of the extruder into the first pressure-joining position 9 so that when the unvulcanized rubber passes between the grooved roll 1 and the pressure-joining roll 8, the rubber is formed into a first rubber sheet 13 in the form of a sheet and is urged against and pressure-joined with one side of the cords 3 arranged with the pitch P. When the first rubber sheet 13 is being pressure-joined, as the cords 3 are restrained by the circumferential grooves 2 of the grooved roll 1 so as not to move in the axial directions of the grooved roll 1, the spaced distances between the cords 3 are maintained over all the width of the first rubber sheet 13 with high accuracy.

The cords 3 then leave the first pressure-joining position 9 together with the first rubber sheet 13 whose halves are pressure-joined with the first rubber sheet 13. Thereafter, the cords 3 come into contact with the guide roll 20 to change their courses and are then fed to the second pressure-joining position 17 angularly spaced by the predetermined angle (X degree) from the first pressure-joining position 9 in the circumferential direction of the pressure-joining roll 8. At this time, each of the cords 3 with the first rubber sheet 13 joined thereto is moved in the respective vertical plane including the first pressure-joining position 9 and perpendicular to the rotating axis of the pressure-joining roll 8. Consequently, the cords 3 are steadily supplied into the second pressure-joining position 17 without being twisted and turned during the movement from the first pressure-joining position 9 to the second pressure-joining position 17. As a result, the distances between the cords 3 joined with the first rubber sheet 13 are securely maintained without being disturbed.

At this time, an unvulcanized rubber is being supplied from the head 29 of the extruder into the forming position 26 so that the unvulcanized rubber is formed into a second rubber sheet 30 in the form of a sheet when passing between the groove forming roll 25 and the forming roll 16. In this case, as the groove forming roll 25 includes the ridges 27 formed on its outer circumference, the second rubber sheet 30 is formed with a plurality of longitudinal grooves 31 in the one surface in contact with the outer circumference of the groove forming roll 25. The second rubber sheet 30 formed with the longitudinal grooves 31 is fed by the rotation of the forming roll 16 to the second pressure-joining position 17 where the second rubber sheet 30 is united with the first rubber sheet 13 and the cords 3 also fed thereto.

In the second pressure-joining position 17, the halves of the cords 3 projecting from the first rubber sheet 13 are buried in the longitudinal grooves 31 of the second rubber sheet 30, while the first and second rubber sheets 13 and 30 are pressure-joined with each other by means of the forming roll 16 and the pressure-joining roll 8 to obtain a complete rubber sheet 35 having the cords therein.

In this case, when the first and second rubber sheets 13 and 30 are pressure-joined with each other, substantial halves of the cords 3 projecting from the first rubber sheet 13 are buried into the plural longitudinal grooves 31 having the semicircular cross-section formed in the second rubber sheet 30 and spaced from one another with the pitch equal to the pitch P of the cords 3. Therefore, the cords 3 are restrained by the longitudinal grooves 31 so as not to move in the axial directions of the pressure-joining roll 8.

Moreover, as the clearance at the second pressure-joining position 17 is substantially equal to the sum of the thicknesses of the first and second rubber sheets 13 and 30. Therefore, when the first and second rubber sheets 13 and 30 are pressure-joined, the rubber constituting the second rubber sheet 30 does not flow in the axial direction of the pressure-joining roll 8. Consequently, the distances between the cords 3 are maintained with high accuracy. When such a rubber sheet 35 with cords maintained with high accuracy is used as a carcass or belt of a pneumatic tire, RFV (radial force variation) is suppressed to a low value to improve uniformity of the tire.

Figure 7:
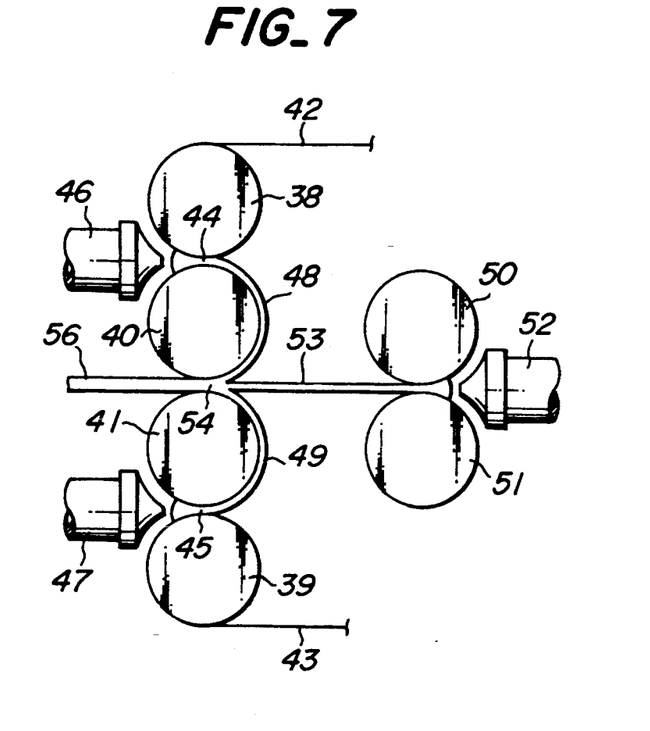
FIG. 7 is a schematic front elevation illustrating the second embodiment of the invention.

FIG. 7 schematically illustrates the second embodiment of the invention. In this embodiment, a pair of grooved rolls 38 and 39 are provided spaced one above the other for controlling pitches of cords 42 and 43, while a pair of pressure-joining rolls 40 and 41 are provided between the grooved rolls 38 and 39. A rubber is supplied from a head 46 of an extruder into a first pressure-joining position 44 between the grooved roll 38 and the pressure-joining roll 40 to form a first rubber sheet 48 which is urged against or pressure-joined with halves of the cords 42 on their one sides to form a rubber cord sheet. On the other hand, a rubber is supplied from a head 47 of an extruder into a first pressure-joining position 45 between the grooved roll 39 and the pressure-joining roll 41 to form a first rubber sheet 49 which is urged against or pressure-joined with halves of the cords 43 on their one sides to form a rubber cord sheet.

Figure 8:
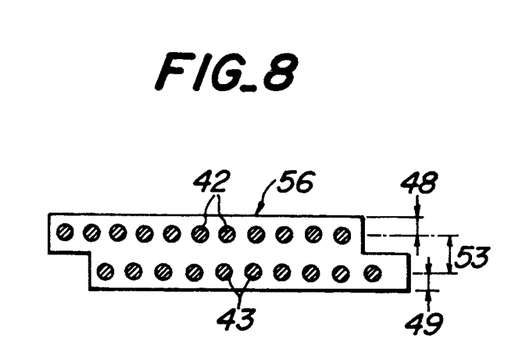
FIGS. 8 and 9 are sectional views illustrating rubber sheets having cords in two rows formed by the second embodiment of the invention, respectively.
Figure 9:
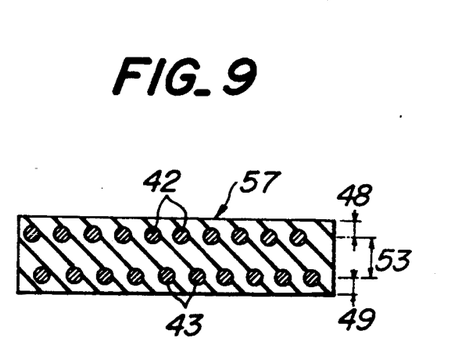

Moreover, a pair of groove forming rolls 50 and 51 are arranged rearward of the pressure-joining rolls 40 and 41. A rubber is supplied from a head 52 of an extruder between the groove forming rolls 50 and 51 to form a second rubber sheet 53 having on both surfaces longitudinal grooves. The cords 42 and 43 joined with the first rubber sheets 48 and 49, respectively, and the second rubber sheet 53 are fed into a second pressure-joining position 54 between the pressure-joining rolls 40 and 42. In the second pressure-joining position 54, the halves of the cords 42 and 43 projecting from the first rubber sheets 48 and 49 are buried into the longitudinal grooves of the second rubber sheet 53, while at the same time these first and second rubber sheets 48, 49 and 53 are pressure-joined with each other to form a rubber sheet 56 or 57 having cords as shown in FIG. 8 or 9. In this embodiment, the pressure-joining rolls 40 and 41 also serve as forming rolls.

In the first embodiment, the cords 3 joined with the first rubber sheet 13 leaving the first pressure-joining position 9 are brought into contact with the guide roll 20 to turn their advancing direction so as to be fed into the second pressure-joining position 17. In the present invention, however, the cords 3 joined with the first rubber sheet 13 may be guided into the second pressure-joining position 17, while keeping the cords 3 being in contact with the outer circumference of the pressure-joining roll 8.

Moreover, in the first embodiment, the rubbers are supplied from the heads 12 and 29 by extrusion into the first pressure-joining position 9 and the forming position 26. In the present invention, rubber sheets at high temperatures cut away from a calender may be directly supplied into the first pressure-joining position 9 and the forming position 26.

As can be seen from the above explanation, according to the invention the accuracy of pitches between cords can be greatly improved. Moreover, by using such rubber sheets having cords arranged with high accuracy for tires, the uniformity of the tires can be remarkably improved.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of forming a rubber sheet having cords therein, comprising the steps of: supplying a plurality of cords into individual circumferential grooves, which are formed in the outer surface of a grooved roll and are equally spaced from one another by a predetermined pitch in an axial direction of the grooved roll, to arrange the cords so that the cords are equally spaced from one another by said predetermined pitch; pressure-joining a first rubber sheet with a half of each of the cords which are restrained in the individual grooves in a first pressure-joining position between the grooved roll and a pressure-joining roll to form a rubber cord sheet; guiding and moving the rubber cord sheet from the first pressure-joining position to guiding means in a plane which is perpendicular to a plane including a rotating axis of the pressure-joining roll and the grooved roll, and which includes the first pressure-joining position, and guiding the rubber cord sheet with the guiding means to a second pressure-joining position between the pressure-joining roll and a forming roll, said second pressure-joining position being angularly spaced by a predetermined angle in a circumferential direction about the pressure-joining roll away from the first pressure-joining position; supplying a second rubber sheet into the second pressure-joining position, said second rubber sheet having formed on at least one surface thereof a plurality of longitudinal grooves spaced equally from one another by said predetermined pitch and corresponding to each of the cords; and pressure-joining the rubber cord sheet and second rubber sheet with each other such that each half of the cords projecting from the first rubber sheet are buried into the longitudinal grooves of the second rubber sheet to form the rubber sheet having the cords therein.

2. The method of forming a rubber sheet having cords therein as set forth in claim 1, wherein the first rubber sheet is formed by supplying unvulcanized rubber into the first pressure-joining position between the grooved roll and the pressure-joining roll.

3. The method of forming a rubber sheet having cords therein as set forth in claim 1, wherein the second rubber sheet is formed by supplying unvulcanized rubber into a space substantially equal to the thickness of the second rubber sheet and formed between the forming roll and a groove forming roll which has a plurality of ridges which extend continuously in the circumferential direction.

4. An apparatus for forming a rubber sheet having cords therein, comprising a grooved roll having a plurality of individual circumferential grooves formed in the outer surface of the grooved roll and spaced equally from one another by a predetermined pitch in an axial direction of the grooved roll for arranging cords with equal pitches and restraining the cords so that they do not move in the axial direction of the grooved roll; a pressure-joining roll arranged to cooperate with the grooved roll at a first pressure-joining position for pressure-joining a first rubber sheet with a half of each of the cords to form a rubber cord sheet; a groove forming roll for forming in at least one surface of a second rubber sheet a plurality of longitudinal grooves spaced equally from one another by the predetermined pitch and corresponding to each of the cords; a forming roll arranged to cooperate with the pressure-joining roll for pressure-joining at a second pressure-joining position the rubber cord sheet and second rubber sheet with each other so as to fit each half of the cords projecting from the first rubber sheet into the longitudinal grooves of the second rubber sheet, the second pressure-joining position being formed between the pressure-joining roll and the forming roll and angularly spaced by a predetermined angle about the pressure-joining roll in a circumferential direction from the first pressure-joining position; and a guide roll arranged in parallel and in front of the pressure joining roll for guiding the rubber cord sheet from the first pressure joining position to the second pressure joining position, wherein axes of the grooved roll, the pressure-joining roll, groove forming roll and the forming roll are parallel to each other.

5. The apparatus for forming a rubber sheet having cords therein as set forth in claim 4, wherein a head of an extruder is provided at the first pressure-joining position for supplying unvulcanized rubber into the first pressure-joining position between the grooved roll and the pressure-joining roll to form the first rubber sheet.

6. The apparatus for forming a rubber sheet having cords therein as set forth in claim 4, wherein the groove forming roll has a plurality of ridges continuously extending in the circumferential direction formed on its outer circumference, the groove forming roll being spaced from the forming roll to form a second rubber sheet forming position; and the apparatus further comprising a head of an extruder for supplying unvulcanized rubber into the second rubber sheet forming position for forming the second rubber sheet having longitudinal grooves formed on a surface thereof.

7. A method of forming a rubber sheet having two rows of cords therein, comprising the steps of:

supplying a first plurality of cords into individual circumferential grooves of a first grooved roll, wherein said grooves of said first grooved roll are formed in the outer surface of the first grooved roll and are equally spaced from one another by a predetermined pitch in an axial direction of the first grooved roll to arrange the first plurality of cords so that the first plurality of cords are equally spaced from one another by said predetermined pitch;

supplying a second plurality of cords into individual circumferential grooves of a second grooved roll, wherein said grooves of said second grooved roll are formed in the outer surface of the second grooved roll and are equally spaced from one another in an axial direction of the second grooved roll by said predetermined pitch, to arrange the second plurality of cords so that the second plurality of cords are equally spaced by said predetermined pitch;

pressure joining a first rubber sheet with a half of each of the first plurality of cords which are restrained in the individual grooves of the first grooved roll in a first pressure-joining position to form a first rubber cord sheet, wherein said first pressure-joining position is formed between the first grooved roll and a first pressure-joining roll;

pressure joining a second rubber sheet with a half of each of the second plurality of cords which are restrained in the individual grooves of the second grooved roll in a second pressure joining position to form a second rubber cord sheet, wherein said second pressure joining position is formed between the second grooved roll and a second pressure joining roll;

moving the first rubber cord sheet and second rubber cord sheet to a third pressure-joining position;

supplying a third rubber sheet to the third pressure-joining position, said third rubber sheet having formed on a first and second surface thereof a plurality of longitudinal grooves spaced equally from one another by said predetermined pitch, said third pressure-joining position being formed between the first and second pressure joining rolls; and pressure-joining the first and second rubber cord sheets with the third rubber sheet such that the longitudinal grooves on the first surface and second surface of the third rubber sheet receive the first plurality of cords and the second plurality of cords, respectively, and so as to form the rubber sheet having two rows of cords formed therein.

8. An apparatus for forming a rubber sheet having two rows of cords therein, comprising:

a first grooved roll having a plurality of circumferential grooves formed in an outer surface thereof and spaced equally from one another by a predetermined pitch in an axial direction of the first grooved roll for restraining a first plurality of cords so that the first plurality of cords do not move in the axial direction of the first grooved roll;

a first pressure joining roll arranged adjacent to the first grooved roll for pressure joining a first rubber sheet with a half of each of the first plurality of cords at a first pressure joining position to form a first rubber cord sheet and for supplying the first rubber cord sheet to a third pressure joining position;

a second grooved roll having a plurality of circumferential grooves formed in an outer surface thereof and spaced equally from one another by the predetermined pitch in an axial direction of the second grooved roll for restraining a second plurality of cords so that the second plurality of cords do not move in the axial direction of the second grooved roll;

a second pressure joining roll arranged adjacent to the second grooved roll for pressure joining a second rubber sheet with a half of each of the second plurality of cords at a second pressure joining position to form a second rubber cord sheet and for supplying the second rubber cord sheet to the third pressure joining position such that the second plurality of cords of the second rubber cord sheet face the first plurality of cords of the first rubber cord sheet; and first and second groove forming rolls for forming a plurality of longitudinal grooves, which are equally spaced from one another by the predetermined pitch, on a first and second surface of a third rubber sheet and for supplying the third rubber sheet to the third pressure joining position;

wherein the first pressure joining roll is adjacent to the second pressure joining roll for pressure joining the first rubber cord sheet and the second rubber cord sheet with the third rubber sheet at the third pressure joining position such that the other half of the first and second plurality of cords are buried in the longitudinal grooves on the first and second surface of the third rubber sheet, respectively, and so as to form the rubber sheet having two rows of cords therein.

9. The apparatus for forming a rubber sheet having two rows of cords therein as set forth in claim 8, wherein a head of an extruder is provided at a position near each of the first and second pressure-joining positions for supplying unvulcanized rubber between the first grooved roll and the first pressure joining roll and between the second grooved roll and the second pressure joining roll to form the first and second rubber sheets.

10. The apparatus for forming a rubber sheet having two rows of cords therein as set forth in claim 8, wherein a head of an extruder is provided at a position near the groove forming rolls for supplying unvulcanized rubber between the groove forming rolls to form the third rubber sheet.

* * * * *